Jan. 11, 1949.　　　P. E. BROOKS　　　2,458,928

WELDING FIXTURE

Filed April 6, 1946

INVENTOR
P.E. BROOKS
BY
W.C. Parnell
ATTORNEY

Patented Jan. 11, 1949

2,458,928

UNITED STATES PATENT OFFICE 2,458,928

WELDING FIXTURE

Percy E. Brooks, Woodridge, N. J., assignor to Western Electric Company, Incorporated, New York, N. Y., a corporation of New York Application April 6, 1946, Serial No. 660,026

3 Claims. (Cl. 219—4)

This invention relates to welding fixtures, particularly for spot welding machines, for use in maintaining the contacting surfaces of companion electrodes in parallel alignment and to serve as work supports.

In welding machines, particularly those of the spot welding type, including electrodes relatively movable to engage opposing surfaces of metal parts to be welded, it is important that the contacting surfaces of the electrodes be maintained in true parallel planes and, in some instances, that these planes be at right angles with respect to the centerlines of the electrodes. This is particularly true when the machine is used to weld, in apertures of a metal structure, mounting screws or the like which must be positioned in accurate alignment so that they will enter freely into correspondingly spaced holes in a support or other unit to which the structure is to be attached.

During the repeated use of the machine the electrode surfaces become oxidized and at frequent intervals this coating must be removed from the contact faces. This is usually accomplished by the aid of a file or other abrasive tools and, without the assistance of any guiding means, it is impossible for the operator to maintain the contact surfaces of the electrodes truly parallel with each other and at the desired angles with respect to the centerlines of the electrodes. The slightest variations of the contact surfaces from the truly parallel relationship will result in a greater variation between the threaded ends of the mounting screws depending upon the lengths of the screws.

An object of the invention is to provide a fixture which is simple in structure, attachable for continued use on an electrode of a welding machine for reconditioning both the electrode to which it is attached and the companion electrode and also for use in accurately supporting parts or structures to be welded.

With this and other objects in view, the invention comprises a fixture centrally apertured for receiving an electrode and slotted from one side thereof to the aperture for mounting at any desired position on the electrode through the aid of a screw. The fixture includes a body formed preferably of insulating material and a wear-resisting element supported by the body, with a surface lying in a plane at right angles to the centerline of the aperture, to surround the electrode and be insulated therefrom by the body whereby, through the aid of an abrasive element, such as a file, the contact surface of the electrode upon which the fixture is mounted may be reconditioned, removing an oxide coating therefrom and forming a contact surface thereon lying in a plane with the said surface of the element. After this has been accomplished, the upper electrode may be lowered under suitable pressure and by movement of the abrasive element on the wear-resisting element, material from the upper electrode may be removed to form a contact surface thereon parallel with the contact surface of the first electrode and the surface of the wear-resisting element. The welding machine is then in condition for operation, the fixture remaining on the electrode so that it may function as a work support in accurately positioning parts to be welded between the two electrodes.

Other objects and advantages will be apparent from the following detailed description when considered in conjunction with the accompanying drawings, wherein Fig. 1 is a vertical sectional view of the fixture shown applied to a welding machine;

Figure 1:
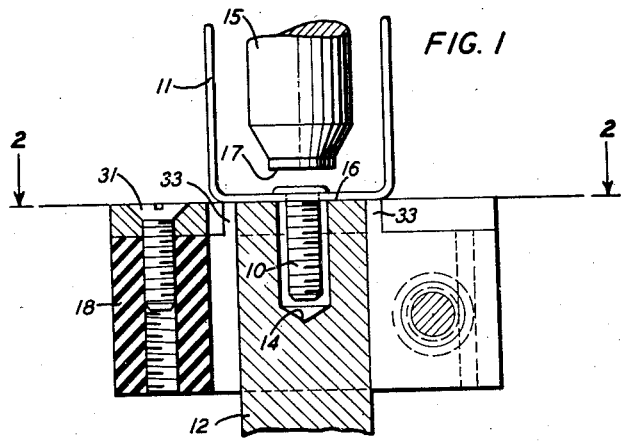
Figure 2:
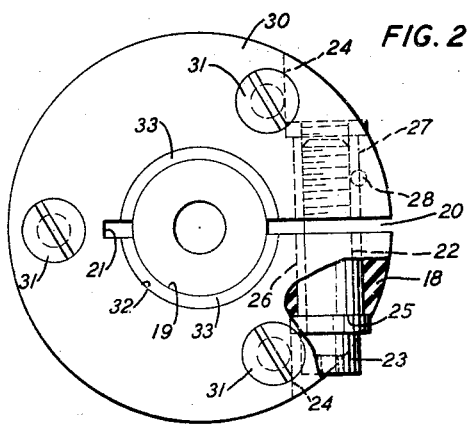
Fig. 2 is a top plan view of the fixture.

Referring now to the drawings, the present embodiment of the invention relates to a fixture for use in welding mounting screws 10 in apertures of a metal structure 11. To accomplish this result, a welding machine includes a stationary lower electrode 12 having a central opening 14 in the upper end thereof to singly receive the mounting screws 10. An upper electrode 15 is reciprocated toward and away from the lower electrode through the conventional means (not shown) during each welding cycle of the machine. The electrodes 12 and 15 are, in the present embodiment, mounted in their respective parts of the machine so that their centerlines will be in true alignment with each other, it being important that the contacting surfaces 16 and 17 thereof lie in truly parallel planes. This condition may exist when the electrodes are initially mounted in the machine, but after repeated use, they will need reconditioning to remove certain portions of the electrodes at the contact surfaces and/or remove the oxide coatings therefrom. Through the aid of the fixture, this may be accomplished with accuracy.

The fixture includes a cylindrical body 18 formed of a durable insulating material such as Masonite or the like. The body 18 is centrally apertured at 19 to receive the electrode 12 and is notched at 20 from one side of the body through the aperture to a position 21 so that the body may be drawn tightly about the electrode and secured thereto by a screw 22. The screw 22 has its head 23 receivable in a cutaway portion 24 of the body providing a shoulder 25 for the head. Metal inserts 26 and 27 are embedded in apertures of the body in central alignment with each other upon each side of the slot 20, the insert 27 being threaded to receive the threaded end of the screw 22 and is held against movement by a locking pin 28.

A supporting element 30 similar in general contour to the body 18 with a notch conforming to the notch 20, is disposed upon the body and secured thereto by screws 31. A central aperture 32 of the support is larger than the aperture 19 of the body so as to receive arcuate members 33 which are integral with the body and extend into the aperture 32 of the support to the upper surface 34 thereof. The support 30 in the present embodiment is formed of extra hard tool steel making it wear resistant and also resistant to a file or abrasive tool 36 used in reconditioning the contact surfaces of the electrodes.

In explaining the use of the fixture, let it be assumed that the fixture is mounted upon the electrode 12 at a time when both electrodes are new. At this time, the fixture will be mounted so that the surface 34 will be in the same plane with the contact surface 16. After repeated use of the electrodes in welding operations, they will need reconditioning and at this time the operator may loosen the screw 23 and lower the fixture on the electrode 12 a distance equal to the length of material he desires to remove from the lower electrode. At this time, with the electrode 15 in its upper position, the operator may remove the desired amount of material from the upper end of the lower electrode by reciprocating the abrasive tool 36 over the upper end of the electrode 12 until the tool moves in engagement with the surface 34 having removed all of the material of the electrode down to the plane of the surface 34. The operator is then assured that the new contact surface for the electrode 12 lies in a plane at right angles with the centerline of the electrode and in the plane of the surface 34.

To recondition the upper electrode 15 it may be lowered on the tool 36 under a given pressure during continued reciprocation of the tool. Although the tool 36 is moved over the lower electrode 12 during reconditioning of the upper electrode, further changes in the lower electrode will not occur due to the wear-resisting nature of the support 30. If desired, both electrodes may be reconditioned simultaneously by positioning the tool 36 between the electrodes after the fixture has been lowered on the electrode 12 the desired distance and reciprocating the tool during continued application of a desired pressure on the upper electrode. This process may be highly desirable, in some instances, where the electrodes are small, but in other instances with larger electrodes, although the time required for reconditioning the electrodes may be longer, the effort necessary will be less tiring to the operator if the electrodes are conditioned singly.

Figure 4:
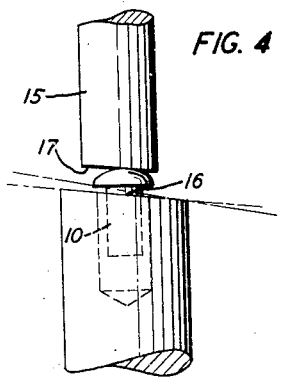
Fig. 4 illustrates possible results of welding mounting screws to a structure without the aid of the fixture.
Figure 3:
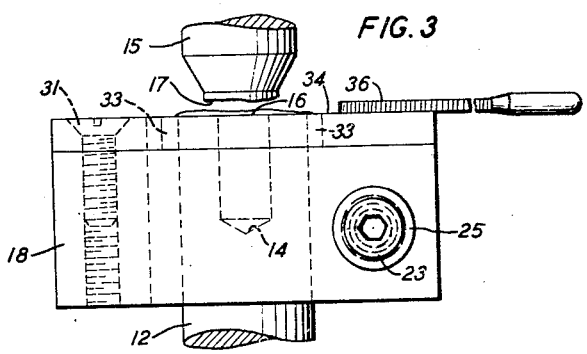
Fig. 3 illustrates the results of welding mounting screws in a supporting structure through the aid of the fixture.

After the electrodes have been reconditioned, the fixture remains in the same position with its upper surface 34 in the plane of the contact surface of the lower electrode 12 to serve as a support for work positioned between the electrodes. When the metal structure 11 rests upon the lower electrode 12 and the surface 34 of the fixture, the mounting screw 10 which is to be welded in place, extends into the opening 14 which is considerably larger than the diameter of the mounting screw and of sufficient length to allow the head of the screw to rest upon the surface of the metal structure to which it is to be welded. The electrode 15 may then be moved downwardly under a desired pressure, its contact surface 17 engaging the head of the screw, forcing it downwardly so that all portions of the under surface of the head will engage all adjacent portions of the structure 11 about the aperture so that a complete and uniform weld may be made between the screw and the metal structure. If the contact surfaces 16 and 17 of the electrodes were not in parallel alignment with each other, or with the parts they are to weld, conditions illustrated in Fig. 4 may result. In other words, the mounting screws may be welded in undesired positions relative to the metal structure and as a result, only small portions of the heads of the screws would be welded in place due to the fact that the screw is not moved to cause all portions of the under surface of the head thereof to engage material of the metal structure completely surrounding the aperture.

Although specific improvements of the invention have been shown and described, it will be understood that they are but illustrative and that various modifications may be made therein without departing from the scope and spirit of this invention as defined by the appended claims.

What is claimed is:

1. A fixture for a welding machine having relatively movable first and second electrodes with work engaging surfaces initially lying in parallel planes, the fixture comprising a wear-resisting element surrounding the first electrode and having a guide surface, an insulating member adjustably mounted on the first electrode to rigidly support the element at an adjusted position with its guide surface short of the work engaging surface of the first electrode a distance equal to the portion of the first electrode to be removed whereby the element may guide an abrasive tool in a plane parallel with the initial work engaging surface, and an abrasive tool movable over the guide surface to remove the said portion of the electrode and produce a new work engaging surface for the electrode lying in the plane of the guide surface of the element.

2. A fixture for a welding machine having relatively movable first and second electrodes with work engaging surfaces initially lying in parallel planes, the fixture comprising a wear-resisting element surrounding the first electrode and having a guide surface, an insulating member adjustably mounted on the first electrode to rigidly support the element at an adjusted position with its guide surface short of the work engaging surface of the first electrode a distance equal to the portion of the first electrode to be removed whereby the element may guide an abrasive tool in a plane parallel with the initial work engaging surface, and an abrasive tool movable over the guide surface to remove the said portion of the electrode and produce a new work engaging surface for the electrode lying in the plane of the guide surface of the element, said guide surface of the element supporting and guiding the abrasive tool during reciprocation thereof while the second electrode is forced under a given pressure into engagement with the tool to cause removal of material from the second electrode to form a new work engaging surface therefor parallel with the said guide surface.

3. A fixture for an electrode, of a welding machine, having a work engaging surface lying in a plane at right angles with respect to the centerline of the electrode, the fixture comprising a wear resisting element surrounding the electrode and having a guide surface, an insulating member to support the element, means to secure the member to the electrode to position the guide surface of the element short of the work engaging surface a distance equal to the portion of the electrode to be removed, whereby the element may guide an abrasive tool in a plane parallel with the initial work engaging surface, and an abrasive tool movable over the guide surface to remove the said portion of the electrode and produce a new work engaging surface for the electrode lying in the last mentioned plane of the guide surface of the element.

PERCY E. BROOKS.

REFERENCES CITED

The following references are of record in the file of this patent:

UNITED STATES PATENTS

| Number | Name | Date |
|---|---|---|
| 1,810,225 | Pugh | June 16, 1931 |
| 1,915,947 | Paugh | June 27, 1933 |
| 1,992,990 | Burns | Mar. 5, 1935 |
| 2,298,633 | Winlock et al. | Oct. 13, 1942 |
| 2,392,736 | Hensel et al. | Jan. 8, 1946 |